Figure 1:
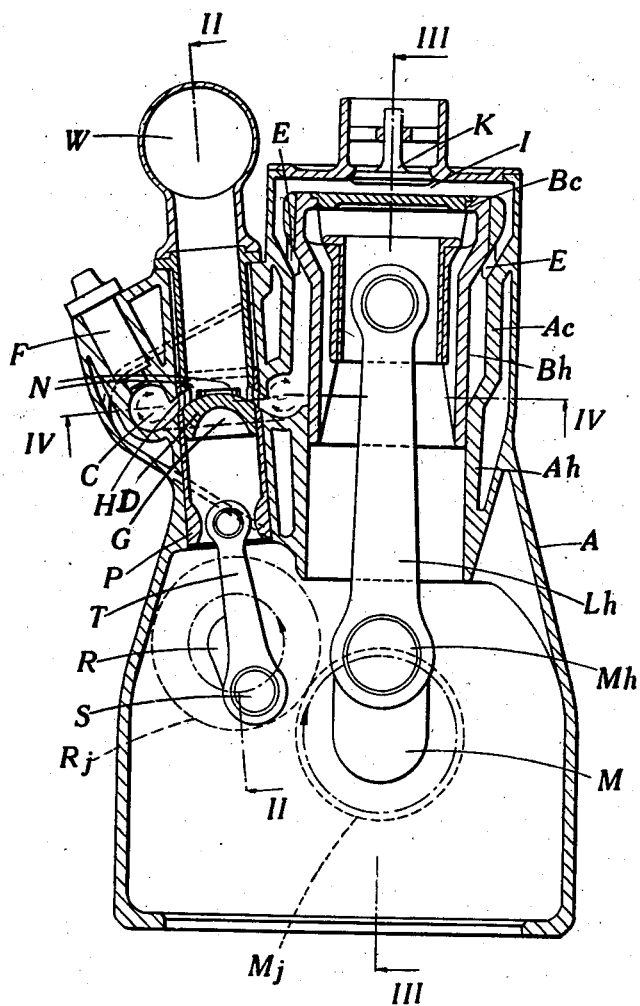

June 25, 1940.   C. J. TÓTH   2,205,608
INTERNAL COMBUSTION ENGINE
Filed May 19, 1938   2 Sheets-Sheet 2

Charles J. Tóth INVENTOR
BY
ATTORNEY

Patented June 25, 1940

2,205,608

UNITED STATES PATENT OFFICE 2,205,608

INTERNAL COMBUSTION ENGINE

Charles Joseph Tóth, Montevideo, Uruguay

Application May 19, 1938, Serial No. 208,891
In Great Britain September 8, 1937

10 Claims. (Cl. 60—13)

This invention relates to compound expansion internal combustion engines.

An object of the invention is to provide the combination of supercharged two stroke cycle internal combustion engines with exhaust driven rotary gas engines, wherein the first named part of the engine forms the high pressure engine portion and the latter named part the low-pressure engine portion and wherein the main driving shafts of the high- and low-pressure engine portions are conveniently connected with each other in such a way that the combined power output of both the high- and low-pressure engine portions, is transmitted to the final-driving shaft of the compound expansion internal combustion engine. The cooperation of the two engine portions is preferably co-ordinated in such a manner that the power output obtained from the low pressure engine portion is pushed to a maximum percentage of the power output of the high pressure engine portion which is delivering the working fluid for the operation of the first named engine portion, without the expenditure of additional fuel consumption, thus securing a maximum thermal efficiency for the compound engine as a whole.

Another object of the invention is to provide in such an engine, a combustion chamber formed so as to secure an intensively swirling motion to the combustion air, during the period of the final compression thereof and at the times when the fuel is to be injected into the compressed charge of combustion air, thus securing complete and rapid combustion of fuel.

Yet another object of the invention is to provide for a convenient uniflow scavenging of the high-pressure engine portion wherein the charge of precompressed scavenging-air is flowing through the whole length of the high pressure cylinder, from one end thereof towards the other end with the immediate consequence of keeping within fairly tolerable limits the mean working temperature of the high-pressure engine portion and, owing to the fact that the scavenging air is also sweeping through the combustion chamber, avoiding any local overheating of this latter.

Yet another object of the invention is to provide for the cooling of the low-pressure engine portion or gas turbine blading on account of the fact that the power gases on which this latter operates consist, besides the partially expanded combustion gases of a considerable amount of precompressed scavenging air, admixed with said gases.

Figure 2:
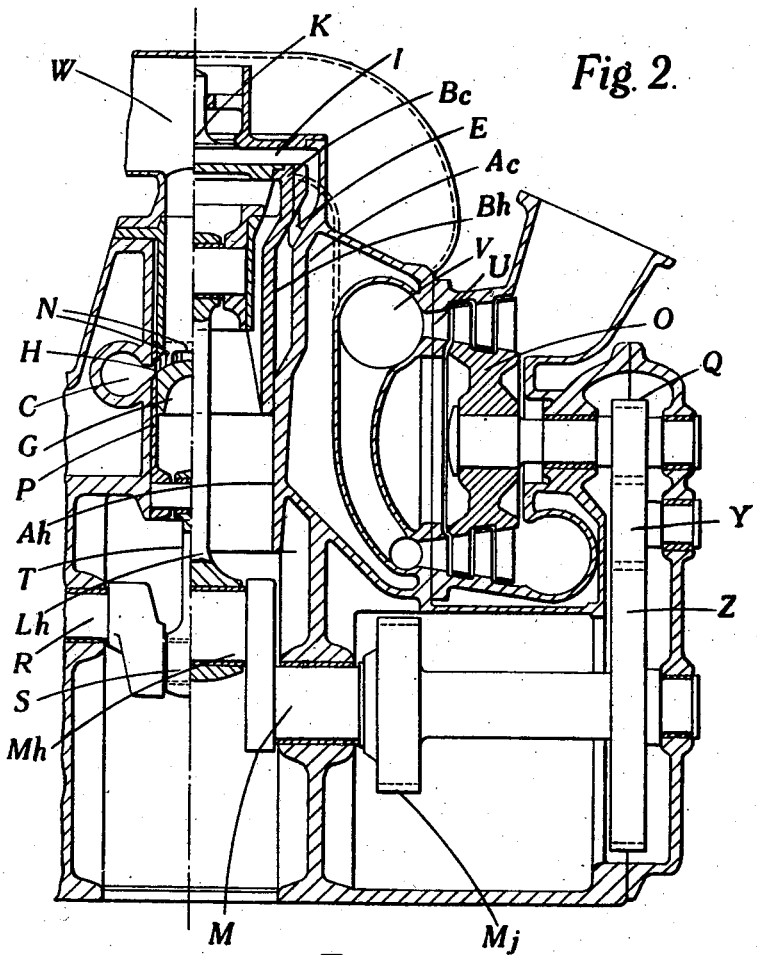
Figure 3:
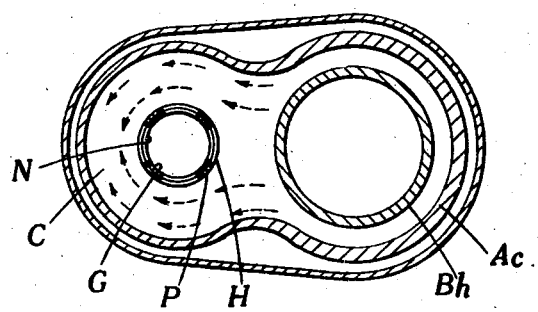

In the drawings:

Fig. 1 shows in cross section, the cylinder element that forms the high-pressure portion of this compound expansion engine, Fig. 2 is a composite cross section, the left hand portion being taken on the line II—II of Fig. 1 and the right hand portion being taken on the line III—III of Fig. 1, and Fig. 3 is a horizontal section through the combustion chamber and the high-pressure engine portion, taken on the line IV—IV of Fig. 1.

In an engine in accordance with the invention the high-pressure portion comprises a reciprocating engine of the supercharged two-stroke cycle type and the low-pressure engine portion comprises a rotary engine or gas turbine, which latter may be conveniently geared to the main shaft of the high-pressure engine portion.

The engine block structure A incorporates together with the crankcase of the engine, the cylinder structure and the combustion chamber, which comprise the high-pressure portion of this compound engine.

The cylinder structure proper has a lower portion $Ah$ of smaller bore and an upper portion $Ac$ of greater bore, wherein the stepped working piston $Bh$—$Bc$ is arranged so that the smaller portion $Bh$ of the piston slides within the cylinder portion $Ah$ and the larger portion $Bc$ of the piston slides within the cylinder portion $Ac$.

The upper portion of the cylinder structure $Ac$ is suitably closed by a cover or head forming a space I which serves for the precompression of the scavenging- and charging-air and which will be referred to as the compressor cylinder. The cover or head of the compressor cylinder is provided with appropriate valve means K for the admission, at suitable times, of atmospheric air into the compressor cylinder.

The amount of precompressed scavenging and charging air provided by the compressor cylinder is much in excess of the net stroke-volume of the corresponding high-pressure working cylinder and the total amount of scavenging and charging air thus produced passes, after every working stroke, through the corresponding working cylinder.

The transfer of the precompressed scavenging- and charging-air from within the compressor cylinder I into the interior of the high-pressure working cylinder is by means of a series of cylinder port-openings E cut into the wall of the larger portion $Ac$ of the working cylinder, near the upper end thereof.

The opening and closing of the cylinder ports E is controlled by the working piston by means of its larger portion $Bc$ so that the port-openings E are uncovered during a period of time when the working piston B$h$—B$c$ is near its outer dead centre, that is, operating within the range of its farthest outward stroke motions.

It will be seen that the high-pressure cylinder is at the crankcase end of the engine structure and the cylinder portion of the larger diameter, which also serves as a compressor cylinder, is at the other extremity of the cylinder structure, that is farthest away from the crankcase.

The scavenging air enters the high-pressure cylinder at one end of the cylinder through the appropriate port openings, and the partially expanded combustion gases and the precompressed scavenging air that is admixed therewith, exhaust from within the high-pressure cylinder at its other end, which is preferably the end where the combustion chamber is located.

The interior of the high-pressure working cylinder itself has the shape of a hollow annular cylinder which is defined, towards the centre by the wall of the piston portion B$h$ and in the other direction by the cylinder wall A$c$. In the direction of the axis of the cylinder, it is limited, at the crankshaft end, by the step connecting the smaller A$h$ and larger A$c$ cylinder walls, respectively and, at the other end by the piston-step between the smaller B$h$ and larger B$c$ piston portions.

Towards the lower end the high-pressure working cylinder, merges over a part of its circumference into the ring-shaped combustion chamber C so that the combustion chamber forms a lateral extension of the interior of the high-pressure cylinder. The combustion chamber is of a circular section on the whole ring of its extension, except that portion where it intercommunicates direct with the interior of the high-pressure cylinder.

In the centre of the ring-shaped combustion chamber are located concentrically within each other, the sleeve valve means P and the hollow bushing G respectively. The sleeve valve P has a series of port-openings H and the hollow bushing G has a series of port openings N cut within its respective walls for the purposes of controlling, at appropriate times, the exhaust of power gases from within the high-pressure cylinder. The hollow bushing G is closed at its lower portion by a sort of deflector wall D that forces the power gases towards the other extremity of the hollow bushing where this latter communicates with the exhaust main or exhaust piping W.

At an appropriate position in the combustion chamber is mounted the fuel injection valve F.

Preferably at that position where, during the latest portion of the compression cycle taking place in the high-pressure cylinder, the turbulent swirl of the compressed combustion air is intense. It will be understood that the injection of the fuel into the swirling combustion air may be effected either by a single or by a multiple jet injection process, or otherwise as described.

As far as the location of the combustion chamber C and, consequently, of the sleeve valve means P in respect to the position of the high-pressure working cylinder is concerned it will be understood that the axes of the high-pressure cylinder and the sleeve valve, that is axis III—III and axis II—II, respectively, may be parallel to each other or may be inclined towards each other at any desired angle, the preferred arrangement being such as to permit the easy dismantling of the constructional elements, pertaining to the exhaust control means, such as the sleeve valve P, the hollow bushing G and others, towards the outer end of the cylinder structure that is, away from the crankcase portion of the engine block.

The working piston B$h$—B$c$ is connected by means of the connecting rod L$h$ with the crank-throw M$h$ of the main crankshaft M of the engine.

The motion of the sleeve valve means P is controlled from the layshaft R either from an appropriate eccentric or, as shown in the drawings from a crankthrow S of the layshaft R, through the intermediary of the connecting rod T.

The lay shaft R may be gear driven from the main crankshaft M, in any desired manner, for example, as shown, by the gear wheels marked M$j$ and R$j$ respectively.

Turning now to the right hand portion of the Fig. 2, that is the longitudinal section of Fig. 1 taken along the axis III—III, besides the constructional details already described, the low-pressure portion of this compound engine is illustrated, in a form of construction where it consists of a two stage turbine wheel, marked O.

Although in this particular case the low pressure gas turbine O is shown as being mounted with its axis parallel to the axis of the main crankshaft M, it is to be understood that the low-pressure engine portion or gas turbine may be mounted in any desired form or position in respect to the high-pressure engine portion, for example with its axis located vertically and/or in a plane inclined at any desired angle to the main crankshaft of the engine.

The low-pressure portion or gas turbine O may be located at any desired position with respect to the engine crankshaft. As shown, it is suitably geared to the main crankshaft M of the engine, by means of any desired form or type of single or multiple reduction gearing so that the power developed by the low-pressure engine portion is added or transferred to the main driving shaft of the engine plant. In the drawings, the gearing is a double reduction gearing with an intermediary gear wheel Y between the pinion Q of the turbine and the gear wheel Z of the main crankshaft M.

As far as the feed of the gas turbine O with working fluid is concerned, the power gases issuing from the high-pressure working cylinders pass into the exhaust main W which conveys them to the main collector V and thence to the entrance nozzles U of the gas turbine.

The operation of the compound expansion internal combustion engine may be characterized as follows:

Suppose that at a certain moment a charge of combustion air has been highly compressed by the working piston B$h$—B$c$ within the combustion chamber C and, at or near the instant of the highest compression pressure a charge of fuel has been injected into the combustion chamber C by the fuel injection valve F.

The working piston B$h$—B$c$, which at the instant of the fuel being injected was at or near its inner dead centre position, will start on an outward stroke, that is a power stroke, on the first stage expansion of the combustion gases. During this same outward stroke of the working piston B$h$—B$c$, it will precompress, on the back thereof, a charge of atmospheric air within the compressor cylinder I.

At or near the moment when the outward moving working piston B$h$—B$c$ arrives at a position of approximately sixty degrees before its outer dead centre position, the sleeve valve means P will have moved to a position where the port-openings H will register with the port-openings N of the hollow bushing G, thus starting the evacuation of the partially expanded combustion gases from within the interior of the high-pressure working cylinder.

Cyclically somewhat later, or more or less at a position when the outward moving high-pressure piston B$h$—Bc is forty five degrees before its outer dead centre position, its larger portion Bc will start to uncover the cylinder port-openings E, thus starting the admission of precompressed air from within the compressor cylinder I into the interior of the high-pressure working cylinder. The precompressed air thus admitted serves the purposes of scavenging the working cylinder of the combustion gases. This scavenging operation is performed in uniflow stream as, in effect, said scavenging air enters through port openings on one extremity of the working cylinder, and after passing through the whole length of the same, exhausts at its other extremity. This scavenging of the high-pressure cylinder lasts during the whole period during which the cylinder port-openings E as well as the ports H and N controlling the exhaust, are simultaneously opened or uncovered.

After the completion of its outward stroke and when the working piston B$h$—Bc is already moving inward, at or near the position when it comes to a position approximately thirty degrees past its outer dead centre, the sleeve valve means P will close the port-openings H and N, thus finishing the evacuation of power gases from within the high-pressure cylinder. The cylinder port-openings E will be kept open during a further short period of time and the charge of precompressed air admitted during this latter period being added to the air already entrapped within the working cylinder, will produce a convenient degree of supercharging of the high-pressure working cylinder by precompressed combustion air.

The cylinder port-openings E will again be closed when the inward moving working piston B$h$—Bc reaches a position of approximately forty five degrees past its outer dead centre position, finishing the period of charging and supercharging of the high-pressure cylinder with fresh combustion air.

During the same inward motion of the working piston B$h$—Bc and after the air precompressed within the compressor cylinder I has been transferred totally into the high-pressure cylinder and the pressure within the compressor cylinder I thus sufficiently decreased, a new charge of atmospheric air will be admitted into the compressor cylinder I, through the intermediary of the valve means K.

After having finished the convenient charging and supercharging of the high-pressure cylinder with precompressed combustion air, the inwardly moving high-pressure piston B$h$—Bc will proceed on the final compression of said combustion air, and will force the entire charge of combustion air into the combustion chamber. Owing to the particular shape of the combustion chamber as well as the form of the opening that interconnects the interior of the high-pressure cylinder with the combustion chamber, the combustion air, upon being forced into the combustion chamber, will flow into it in a swirling and turbulent motion, as a consequence of the fact that different streams of combustion air are impinging upon each other. In effect, it may be said that two streams are flowing in the direction of the central circle of the combustion chamber more or less in the way as marked by the arrows in the accompanying sketch Fig. 3, and what we may term a secondary air-swirl or air-turbulence is also being built up, within the combustion chamber, more or less in the sense and direction marked by the arrows in the sketch Fig. 1 that is, in circles that are coincident with the cross-sectional-circles of the ring-shaped combustion chamber.

Now in order that a rapid and complete combustion may be obtained, the fuel-injection valve F is mounted at such a position of the combustion chamber that the injected fuel penetrates into the centre of the most intensive swirling and turbulent motion of the combustion air.

The injection of fuel is effected at or near the moment when maximum compression pressure is reached which occurs at or near the moment when the inward moving working piston reaches its inner dead center position.

As soon as the fuel charge is injected and its combustion performed, and the first stage expansion of the combustion gases started, the operation of the high-pressure cylinder portion is repeated as heretobefore described.

As far as the second stage expansion, or the operation of the low-pressure engine portion is concerned the power gases that is, the partially expanded high-pressure combustion gases admixed with precompressed scavenging-air, as soon as they have left the interior of the high-pressure working cylinder, after every working stroke thereof, under the control of the sleeve valve means P, are conveyed, in a direct flow, by the way of the exhaust mains W into the collector space V of the gas turbine O, in order to render therein additional useful work, in a second stage expansion. Within the gas turbine O the power gases may render useful work in such a way that, upon their final evacuation from the low-pressure engine portion, (that is the gas turbine) they will have reached approximately atmospheric pressure and temperature conditions.

It will be understood that the total amount or precompressed scavenging and charging air produced in the compressor cylinder is transferred into the high-pressure working cylinder, after every working stroke therein and that the total amount of power gases evacuated from within the high pressure cylinder, at appropriate times, is transferred for the purposes of a second stage expansion, into the gas turbine which constitutes the low-pressure engine portion.

In view of the fact that the power gases themselves, that is, the working fluid on which the low-pressure engine portion operates, do not consist purely of high temperature combustion gases but are diluted by a considerable amount of precompressed scavenging air, a convenient cooling of the gas-turbine-blading is obtained owing to the presence of that amount of precompressed air within the mass of power gases as they enter the low-pressure engine portion.

The power produced by the low-pressure engine portion or gas turbine O will be transmitted direct, by the way of the corresponding simple or multiple gearing, such as the gear-train shown by the pinion Q and crown Z, or similar adequate means, to the main driving shaft of the compound engine, which latter named shaft may be coincident with the main crankshaft M of the high-pressure engine portion.

It is to be understood that various combinations and subcombinations of the different constructional details described in connection with the present invention may be employed, without departing from the subject matter of the present invention.

The auxiliary work necessary for the functioning of the engine (such as the precompression of the required amount of precompressed scavenging and charging air; the operation of the fuel-injection pumps; the actuation of the lay-shaft from which the driving of the control-valve-means is derived, and so forth) is performed by the high-pressure portion of the engine plant, with the consequence that the additional useful work that in this engine is performed by the low-pressure portion of the engine will be nearly totally added as net engine output to the main driving shaft of the engine. The percentage of output derived from the low-pressure engine portion, in respect to the net power output of the high-pressure engine portion, will thus be higher than has been obtained, as far as I am aware, from any compound internal combustion engine plant in existence.

The details of construction may be varied in accordance with the requirements and known constructional features may be adopted, as desired, with respect to the different control organs of the engine structure, without departing from the present invention, as illustrated and described heretobefore.

It is also understood that the compound internal combustion engine forming the subject matter of the present invention may be cooled either by water, air or other means; the application of cooling means may either be limited to the high-pressure engine portion alone or else it may be applied also to the low-pressure engine portion or gas turbine.

To control the power output of a compound expansion engine built in accordance with the design features hereinbefore outlined, I may avail myself of any of the known and conventional methods that are employed in current practice, and, among such, methods may be employed according to which for the purposes indicated I resort to a convenient variation of the amount of fuel injected and/or of the amount of atmospheric air admitted into the compressor cylinder, or other methods either alone or combined.

I claim:

1. A compound expansion internal combustion engine comprising a two-stroke reciprocating engine having a cylinder having an expansion space and a precompression space, and a piston reciprocable in the cylinder to precompress air in the precompression space, a toroidal combustion chamber communicating with the expansion space, means for injecting fuel into the combustion chamber, means for transferring precompressed air from the precompression space to the expansion space, a rotary gas engine, and means for transferring the products of combustion from the expansion space to the rotary gas engine for secondary expansion therein.

2. A compound expansion internal combustion engine comprising a cylinder having an expansion space and a precompression space, a piston reciprocable in the cylinder to precompress air in the precompression space, a toroidal combustion chamber communicating with the expansion space, means for injecting fuel into the combustion chamber, means for transferring precompressed air from the precompression space to the expansion space, a rotary gas engine, and means comprising a sleeve valve coaxial with and surrounded by the toroidal combustion chamber for transferring the products of combustion from the expansion space to the rotary gas engine for secondary expansion therein.

3. A compound expansion internal combustion engine comprising a cylinder having an expansion space and a precompression space, a piston reciprocable in the cylinder to precompress air in the precompression space, a toroidal combustion chamber communicating with the expansion space, means for injecting fuel into the combustion chamber, means for transferring precompressed air from the precompression space to the expansion space, a rotary gas engine, a reservoir, means comprising a sleeve valve coaxial with and surrounded by the toroidal combustion chamber for transferring the products of combustion from the expansion space to the reservoir and means for transferring the products of combustion from the reservoir to the rotary gas engine for secondary expansion therein.

4. A compound expansion internal combustion engine comprising a two-stroke reciprocating engine having a cylinder having an expansin space and a precompression space, and a piston reciprocable in the cylinder to precompress air in the precompression space, a toroidal combustion chamber communicating with the expansion space, means for injecting fuel into the combustion chamber, means for transferring precompressed air from the precompression space to the expansion space, a rotary gas engine, and means for transferring the products of combustion from the expansion space to the rotary gas engine for secondary expansion therein, operating in such cyclical relation to the means for transferring precompressed air to the expansion space that the expansion space is scavenged completely by the precompressed air, part of which is mixed with the combustion products and transferred to the rotary gas engine.

5. A compound expansion internal combustion engine comprising a two-stroke reciprocating engine having a cylinder having an expansion space and a precompression space, and a piston reciprocable in the cylinder to precompress air in the precompression space, a toroidal combustion chamber communicating with the expansion space and formed so that air entering the combustion chamber from the expansion space is caused to flow around the chamber in two streams which impinge on one another and partake of a secondary rotation in planes perpendicular to the plane of rotation, means for injecting fuel into the combustion chamber, means for transferring precompressed air from the precompression space to the expansion space, a rotary gas engine, and means for transferring the products of combustion from the expansion space to the rotary gas engine for secondary expansion therein.

6. A compound expansion internal combustion engine comprising a two-stroke reciprocating engine having a cylinder having an expansion space and a precompression space, and a piston reciprocable in the cylinder to precompress air in the precompression space, a toroidal combustion chamber communicating with the expansion space, means for injecting fuel into the combustion chamber, means for transferring precompressed air from the precompression space to the expansion space, said air passing in uniflow direction through the expansion chamber and combustion chamber to scavenge them, and part of said air being further compressed in the combustion chamber, a rotary gas engine, and means for transferring the products of combustion from the expansion space to the rotary gas engine for secondary expansion therein.

7. A compound expansion internal combustion engine comprising a cylinder having an expansion space and a precompression space, a piston reciprocable in the cylinder to precompress air in the precompression space, a toroidal combustion chamber communicating with the expansion space, and formed so that air entering the combustion chamber from the expansion space is caused to flow around the chamber in two streams which impinge on one another and partake of a secondary rotation in planes perpendicular to the plane of rotation, means for injecting fuel into the combustion chamber, means for transferring precompressed air from the precompression space to the expansion space, said air passing in uniflow direction through the expansion chamber and combustion chamber to scavenge them, and part of said air being further compressed in the combustion chamber, a rotary gas engine, a reservoir, means comprising a sleeve valve coaxial with and surrounded by the toroidal combustion chamber for transferring the products of combustion from the expansion space to the reservoir and means for transferring the products of combustion from the reservoir to the rotary gas engine for secondary expansion therein.

8. A compound expansion internal combustion engine comprising a cylinder having an expansion space and a precompression space, a piston reciprocable in the cylinder to precompress air in the precompression space, a toroidal combustion chamber communicating with the expansion space, and formed so that air entering the combustion chamber from the expansion space is caused to flow around the chamber in two streams which impinge on one another and partake of a secondary rotation in planes perpendicular to the plane of rotation, means for injecting fuel into the combustion chamber, means for transferring precompressed air from the precompression space to the expansion space said air passing in uniflow direction through the expansion chamber and combustion chamber to scavenge them, and part of said air being further compressed in the combustion chamber, a rotary gas engine, a reservoir, means comprising a sleeve valve coaxial with and surrounded by the toroidal combustion chamber for transferring the products of combustion from the expansion space to the reservoir and means for transferring the products of combustion from the reservoir to the rotary gas engine for secondary expansion therein, operating in such cyclical relation to the means for transferring precompressed air to the expansion space that the expansion space is scavenged completely by the precompressed air part of which is mixed with the combustion products and transferred to the rotary gas engine.

9. A compound internal combustion engine comprising a crankshaft, a stepped cylinder arranged with its portion of larger diameter most remote from the crankshaft, a stepped piston reciprocable in the cylinder and forming with the cylinder an annular expansion space, the piston precompressing scavenging and charging air in the cylinder portion of larger diameter, means for transferring precompressed scavenging and charging air to the annular expansion space, a low pressure gas turbine gear connected to the crankshaft, and means for transferring products of combustion from the annular expansion space of the cylinder to the low pressure turbine.

10. A compound internal combustion engine comprising a stepped cylinder, a stepped piston reciprocating in the cylinder and connected to a crankshaft, said cylinder and said piston being arranged to provide an annular expansion space and a precompression space more remote from the crankshaft than is said expansion space, said precompression space being connected to said annular expansion space by ports in the cylinder wall at the end of the expansion space furthest from the crankshaft and controlled by the piston, a rotary gas turbine, and means for transferring combustion products from the expansion space to the rotary gas turbine, said means being in communication with the end of the expansion space nearest the crankshaft, and being so controlled in relation to the control of the ports connecting the expansion space with the precompression space that air from the precompression space enters the expansion space, passes therethrough to uniflow direction and is transferred to the rotary gas turbine with the combustion products.

CHARLES JOSEPH TÓTH.